US012604002B2

(12) United States Patent
Edpalm et al.

(10) Patent No.: US 12,604,002 B2
(45) Date of Patent: Apr. 14, 2026

(54) METHOD AND ENCODER FOR ENCODING LIDAR DATA

(71) Applicant: Axis AB, Lund (SE)

(72) Inventors: Viktor Edpalm, Lund (SE); Niklas Hansson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/659,067

(22) Filed: May 9, 2024

(65) Prior Publication Data

US 2024/0406390 A1    Dec. 5, 2024

(30) Foreign Application Priority Data

Jun. 5, 2023    (EP) ..................................... 23177274

(51) Int. Cl.
| | |
|---|---|
| *H04N 19/119* | (2014.01) |
| *H04N 19/136* | (2014.01) |
| *H04N 19/172* | (2014.01) |
| *H04N 19/174* | (2014.01) |
| *H04N 19/184* | (2014.01) |
| *H04N 19/186* | (2014.01) |

(52) U.S. Cl.
CPC ......... *H04N 19/119* (2014.11); *H04N 19/136* (2014.11); *H04N 19/172* (2014.11); *H04N 19/174* (2014.11); *H04N 19/184* (2014.11); *H04N 19/186* (2014.11)

(58) Field of Classification Search
CPC .................................................... H04N 19/119
See application file for complete search history.

(56) References Cited

U.S. PATENT DOCUMENTS

| | | |
|---|---|---|
| 2020/0394822 A1 | 12/2020 | Gao et al. |
| 2021/0149055 A1 | 5/2021 | Hanczor et al. |
| 2021/0150766 A1 | 5/2021 | Mammou et al. |
| 2021/0333400 A1 | 10/2021 | Kim et al. |
| 2022/0292722 A1 | 9/2022 | Mammou et al. |

(Continued)

FOREIGN PATENT DOCUMENTS

CN          114265035 A      4/2022

OTHER PUBLICATIONS

Extended European Search Report issued on Nov. 20, 2023 for European Patent Application No. 23177274.0.

(Continued)

*Primary Examiner* — Jerry T Jean Baptiste
(74) *Attorney, Agent, or Firm* — Volpe Koenig

(57) ABSTRACT

A method for encoding lidar data where subsequent frames of lidar data to be encoded are received. Each frame of lidar data comprises a number of lidar return signals for each of a plurality of rays emitted at a respective elevation and azimuth angle by a lidar, and each lidar return signal includes lidar measurement values. Each frame of lidar data is then represented as an image frame of a video sequence, wherein, for each ray of the plurality of rays of the frame of lidar data, lidar measurement values of different lidar return signals are represented in different image portions of the image frame. The different image portions are stacked after each other in a row direction or a column direction of the image frame. The video sequence is then encoded using video encoding.

13 Claims, 4 Drawing Sheets

(56) References Cited

U.S. PATENT DOCUMENTS

| | | | |
|---|---|---|---|
| 2023/0105931 A1* | 4/2023 | Van der Auwera .. | H04N 19/503 |
| | | | 382/232 |
| 2024/0201377 A1* | 6/2024 | Nestinger ............... | G01S 17/89 |

OTHER PUBLICATIONS

Peter van Beek, "Image-based compression of LiDAR sensor data" in Proc. IS&T Int'l. Symp. on Electronic Imaging: Autonomous Vehicles and Machines Conference, 2019, pp. 43-1-43-7, https://doi.org/10.2352/ISSN.2470-1173.2019.15.AVM-043.

* cited by examiner

300

302

400

402
Receiving subsequent frames of lidar data to be encoded

404
Representing each frame of lidar data as an image frame of a video sequence

406
Encoding the video sequence using video encoding

206

306

306-i

606

604

112    116

602-1

114

602-2

602-3

METHOD AND ENCODER FOR ENCODING LIDAR DATA

TECHNICAL FIELD

The present invention relates to the field of encoding of lidar data. In particular, it relates to an encoding method and an encoder for encoding lidar data.

BACKGROUND

Lidar technology has successfully been used in the automotive industry for years and has recently also been considered in the surveillance industry as a complement to surveillance cameras and radars. A lidar can create high-resolution three-dimensional images which can be used to detect range, reflectivity, direction, and velocity of objects in its field of view. Compared to a camera, a lidar is less dependent on the lighting condition in the scene which makes it attractive for surveillance in low light conditions.

A lidar operates to repeatedly scan the monitored scene with a laser by emitting laser rays at different elevation and azimuth angles and record various parameters of any return signal that comes back to the lidar. A laser ray emitted at a certain elevation of azimuth angle may result in none, one, or several return signals. Each return signal, in turn, result in measurements of one or more physical parameters, such as range, reflectance, and velocity (doppler shift) of the object in the scene that reflected the laser ray to produce the return signal. The lidar hence produces a vast amount of data when repeatedly scanning the scene. For example, it may produce an amount of data in the order of 100 MB/s.

Due to the size of the lidar data, it is preferably compressed before transmission and storage. For instance, it would be desirable to compress the data with a factor of 20 from about 100 MB/s to 5 MB/s. It has been suggested in US 2020/0394822A1 to represent the lidar data as a two-dimensional color image and use image or video compression techniques to compress the lidar data. On a similar topic, US 2022/0292722A1 has suggested to convert a point cloud into an image representation by segmenting the point cloud into patches which are contiguous subsets of a surface described by the point cloud. These patches are then projected onto respective projection planes to generate patch images which in turn are packed into an image frame. However, there is still room for improvements, especially regarding how to efficiently handle the fact that an emitted laser ray may result in several return signals.

SUMMARY OF THE INVENTION

In view of the above, it is thus an object of the present invention to mitigate the above problems and provide ways of efficiently encoding lidar data, especially when the emitted rays may result in more than one return signal.

This object is achieved by the invention defined by the appended independent claims. Example embodiments are defined by the appended dependent claims.

According to a first aspect of the invention, the above object is achieved by a method for encoding lidar data. The method comprises:

receiving subsequent frames of lidar data to be encoded, wherein each frame of lidar data comprises a number of lidar return signals for each of a plurality of rays emitted at a respective elevation and azimuth angle by a lidar, and wherein each lidar return signal includes lidar measurement values, representing each frame of lidar data as an image frame of a video sequence, wherein, for each ray of the plurality of rays of the frame of lidar data, lidar measurement values of different lidar return signals are represented in different image portions of the image frame, wherein the different image portions are stacked after each other in a row direction or a column direction of the image frame, wherein each image portion has a pixel grid corresponding to elevation and azimuth angles and pixel values formed from the lidar measurement values of the lidar return signals represented in that image portion, wherein the pixel values of an image portion are formed from the lidar measurement values by interpolating the lidar measurement values from the elevation and azimuth angles of the plurality of rays to the pixel grid of the image portion, and encoding the video sequence using video encoding.

With this method, different return signals are represented in different image portions which are stacked after each other to form an image frame. In this way, a frame of lidar data can efficiently be represented and encoded as a single image frame even in cases when some of the emitted rays result in more than one return signal.

As mentioned above, lidar data is typically collected by repeatedly scanning a scene with a laser by emitting laser rays at different elevation and azimuth angles and record various parameters of any return signal that comes back to the lidar. As used herein, a frame of lidar data refers to lidar data collected during one such scan of the scene. Accordingly, as the lidar repeats the scanning of the scene, a sequence of frames of lidar data is generated. Sometimes, a scan of a lidar is also referred to as a sweep.

For each laser ray emitted by the lidar, a number of lidar return signals may be recorded in the lidar data. The number may be none, one, or several lidar return signals. For example, if the lidar is pointed to a clear sky in which there are no reflecting objects there may be no return signal, while there may be several return signals when there are several reflecting objects in the way of the laser ray. It is assumed herein that at least one of the emitted laser rays results in several lidar return signals.

By different image portions being stacked after each other in a row direction or a column direction of the image frame is meant that the image portions are arranged or located after each other in the image plane of the image frame. The row direction refers to the direction in the image plane in which pixel rows of the image frame extends and the column direction refers to the direction in the image plane in which pixel columns of the image frame extends.

By representing a frame of lidar data as an image frame is generally meant that the lidar data in the frame is converted or mapped to an image frame. For example, elevation and azimuth angles of the emitted rays may be converted or mapped to pixel positions of the image frame, a lidar measurement values may be converted or mapped to pixel values of the image frame. By a lidar measurement value being represented in an image portion of the image is generally meant that the lidar measurement value is converted or mapped to a pixel value of a pixel in the portion of the image.

The encoding efficiency is further affected by the choice of which return signal has its lidar measurement values represented in which image portion. For example, in order to take advantage of the temporal encoding offered by video encoding techniques it is preferred that return signals resulting from a certain object in the scene are arranged in the same image portion in the current image frame as well as in temporally adjacent image frames. If so, the lidar measurement values such as range, reflectance, and velocity of the object can be efficiently encoded temporally by referring back to the corresponding values in the previous image frame. One way to achieve this is to determine, for each ray of the plurality of rays of the frame of lidar data, which lidar return signal to have its lidar measurement values represented in which image portion depending on the lidar measurement values of the lidar return signal.

For example, in one embodiment the lidar measurement values of each lidar return signal include a range value, and wherein, for each ray of the plurality of rays of the frame of lidar data, the measurement values of a lidar return signal having a largest range value are represented in a first image portion, and measurement values of a lidar return signal having a second largest range value are represented in a second image portion.

In this case, the inventors have realized that for each ray the return signal having the largest range value typically corresponds to the background in the scene. By sorting the return signals into the image portions of the image frames according to decreasing range, the background in the scene is typically represented in the same image portion in each image frame. As a result, it can be encoded efficiently using temporal encoding.

In other embodiments, the determination of which lidar return signal to have its measurement values represented in which image portion depends on similarity in lidar measurement values, such as range, reflectance and doppler shift, of lidar return signals of different rays. In particular, the lidar measurement values of each lidar return signal may include a doppler shift value, and wherein the determination of which lidar return signal to have its measurement values represented in which image portion depends on similarity in doppler shift values of lidar return signals of different rays. This embodiment will cause lidar return signals having similar doppler shift values to be represented in the same image portion in the image frames. As lidar return signals which are reflected off the same object typically has similar doppler shift values, lidar return signals from the same object will be represented in the same image portion in the image frames. As a consequence, the lidar measurement values can be efficiently encoded temporally. In another example, the determination of which lidar return signal to have its measurement values represented in which image portion depends on similarity in range values of lidar return signals of different rays. This embodiment will cause lidar return signals having similar range values to be represented in the same image portion in the image frames.

At least two of the different image portions may be encoded as different slices or tiles. As known in the art of video encoding, a slice or a tile refers to a spatially distinct region of an image frame that is encoded separately from any other region in the same image frame. Thus, different image portions may be encoded separately from each other. This in turn allows different image portions to be decoded separately. Encoding as separate slices/tiles may also be advantageous in that some slices/tiles may be omitted from encoding to save processing power, or may be discarded before transmission or storage to save bandwidth or storage space.

Different levels of compression may be applied to at least two of the image portions. This may be advantageous in various situations. For example, it is noted that the resolution of the lidar as measured in the number of emitted rays per area decreases with distance. Further, it is also noted that at a certain distance a certain resolution is required to be able to identify an object. Therefore, in an embodiment where the return signals are sorted into the different image portions in the order of decreasing range, it would make sense to compress an image portion that corresponds to a greater range at a lower level of compression than an image portion that corresponds to a closer range. In that way, the encoding becomes more efficient while not compromising the capability of identifying objects from the lidar data.

According to the invention, each image portion has a pixel grid corresponding to elevation and azimuth angles and pixel values formed from the lidar measurement values of the lidar return signal represented in that image portion. The pixel grid is preferably the same over time, i.e., in each image frame, to facilitate comparison of pixel values over time and temporal encoding. However, a problem which may occur is that due to tolerances in the lidar mechanics, there may be variations in the elevation and azimuth angles of the emitted rays between different scans of the lidar, i.e., between different frames. If the pixel grid were defined by the elevation and azimuth angles of the plurality of rays emitted by the lidar during a scan, it would hence not be constant over time. In order to deal with this problem, the pixel values of an image portion is according to the invention formed from the lidar measurement values by interpolating the lidar measurement values from the elevation and azimuth angles of the plurality of rays to the pixel grid of the image portion. In that way, comparison of pixel values over time and temporal encoding is facilitated.

The lidar measurement values of each lidar return signal may include a measurement value of a first parameter, a measurement value of a second parameter, and a measurement value of a third parameter, wherein the measurement value of the first parameter is represented in a first color channel of the image frame, the measurement value of the second parameter is represented in a second color channel of the image frame, and the measurement value of the third parameter is represented in a third color channel of the image frame. By using a color image, measurement values of different parameters may be represented in the same image frame using different color channels. The first parameter may correspond to range, the second parameter to reflectance, and the third to doppler shift.

The second and the third color channel may have a lower resolution than the first color channel. For example, the range parameter may be described with higher resolution than reflectance and doppler shift since it is believed to be most important for surveillance applications. In particular, the image frame may be represented in the YUV 4:2:0 color format which is a common format used in video encoding, thereby making the method suitable for use together with existing video encoders.

Further, existing video encoders typically support pixel values of a certain bit depth, such as 8 or 10 bits. However, it is not uncommon that one or more of the measurement values of the lidar data, such as the range measurement value, is represented by a higher number of bits. In other words, the lidar measurement values may include a measurement value of a first parameter which is represented using a first number of bits, and pixel values in the image frame may be represented by a second number of bits which is lower than the first number of bits. Therefore, such a measurement value of the lidar data cannot be represented as a single pixel value of the image frame. To deal with this issue, for each image portion, a first subset of the first number of bits may be represented in a first sub-portion of the image portion and a second subset of the first number of bits may be represented in a second sub-portion of the image portion. The second sub-portion of the image portion may further be stacked after the first sub-portion of the image portion in one of said row direction or column direction of the image frame. In this way, the lidar measurement values of a lidar data frame may still be represented in a single image frame even when a measurement value is represented by more bits than the bit depth of the image frame.

The first subset of bits and the second subset of bits may be odd and even bits, respectively. This has several advantages. To start with, if the most significant bits instead were represented in the first sub-portion and the least significant bits in the second sub-portion, a coding error in the first sub-portion would have an impact which could even exceed the information in the least significant bits. This risk is mitigated by dividing the bits into even and odd bits. A further advantage is that, if even further compression is desired, the second sub-portion with even bits can be discarded, while the remaining first sub-portion still gives an acceptable resolution spatially and temporally also for lower values.

Another approach for reducing the impact of coding errors in an embodiment where the first subset of bits includes the most significant bits and the second subset of bits includes the least significant bits is to append one or more ancillary bits to the first subset of bits prior to encoding. Possibly, one or more ancillary bits may also be added to the second subset of bits. These ancillary bits will then be removed again at the decoding side after decoding. Upon encoding, any encoding error will mostly affect the lowest bits. Accordingly, it will in this case mostly affect the appended ancillary bits rather than the first subset of bits that correspond to the most significant bits of the measurement value of the first parameter. The ancillary bits may hence be said to protect the most significant bits from encoding errors. In that way, they act as an aid or support when encoding the first subset of bits, thereby being ancillary. The ancillary bits may generally be seen as additional bits which are appended after the least significant bits of the first subset of bits. The values of the additional bits are predefined.

The first sub-portion and the second sub-portion of at least one image portion may be encoded as different slices or tiles. Again, this allows the different sub-portions to be encoded and decoded separately. It further allows removal of a sub-portion from the video after encoding if a higher compression is desired.

Further, when encoding the video sequence, a lower level of compression may be applied to the first sub-portion compared to the second sub-portion of at least one image portion. This may be used to compensate for the fact that the coding error has a larger impact in the first sub-portion, both when the first sub-portion includes the even bits or when it includes the most significant bits. For example, in the embodiment with odd bits in the first sub-portion and even bits in the second sub-portion, a coding error in the first-sub-portion (odd bits) is double in size compared to an error in the second sub-portion (even bits). Therefore, a compression level which is a factor of two lower could be used in the first sub-portion compared to the second sub-portion.

According to a second and third aspect of the invention, the above object is achieved by an encoder for encoding lidar data and a non-transitory computer-readable medium, respectively, as defined by the independent claims. The second and third aspects may generally have the same features and advantages as the first aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

Figure 1:
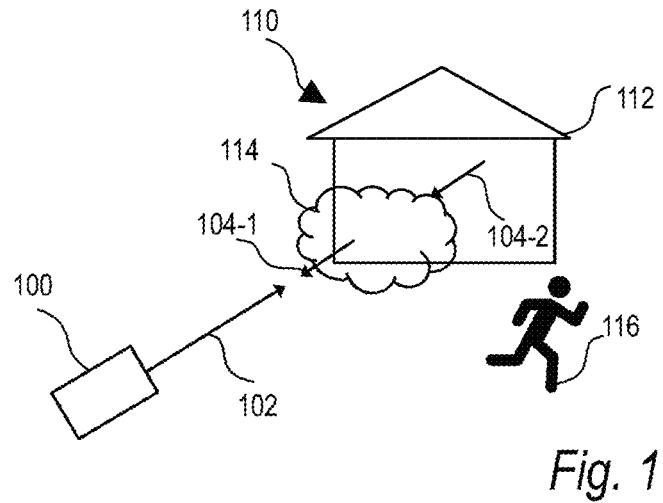
FIG. 1 illustrates a lidar which is used to monitor a scene.

FIG. 1 illustrates a lidar 100 which is used to monitor a scene 110. The scene 110 includes objects, such as a house 112, a bush 114 in front of the house 112, and a person 116. The lidar 100 scans the scene 110 by emitting laser rays 102 towards the scene 110. An emitted laser ray 102 is reflected off objects in the scene 110 and returns to the lidar 100 in the form of return signals 104. As the laser ray 102 travels away from the lidar 100 its cross-section increases. As a consequence, one emitted laser ray 102 may result in more than one return signal 104. In the illustrated example, the laser ray 102 results in two return signals, one return signal 104-1 from a reflection in the bush and another return signal 104-2 from a reflection in the house from a portion of a ray having passed through the bush. It is understood that an emitted laser ray 102 in principle may result in any number of return signals, such as no return signal, one return signal, or several return signals. However, there is typically a maximum number of return signals per emitted ray that the lidar 100 is able to detect. To exemplify, there are commercially available lidars that are able to detect up to three or up to six return signals per emitted ray. The return signals 104 are detected as they come back to the lidar 100. Each return signal 104 is indicative of various parameters or properties, such as range, reflectivity, and velocity (doppler shift), of the object that reflected the laser ray 102. Therefore, from each return signal 104, the lidar 100 may produce measurements of these parameters, herein referred to as lidar measurement values, and associate these with the return signal 104. How the lidar 100 produces such measurement values is per se known in the art.

Table 1 below is an example of what type of data the lidar 100 produces for each emitted ray, together with the number of bits used to represent each data item. As can be seen therein, for each ray there is provided a scan ID which is indicative of during which scan of the scene the ray was emitted. For each ray there is also provided a time when the ray was emitted, and the elevation and azimuth angle at which the ray was emitted. Further, there are provided measurement values of various parameters for each return signal associated with the ray. In this case, this includes a measurement of range, reflectance, and doppler shift (velocity), but there are many lidars which only measure range and reflectance.

TABLE 1

| Ray | | |
|---|---|---|
| scan ID | 7 bits | 8 bytes |
| time | 24 bits | |
| elevation | 16 bits | |
| azimuth | 16 bits | |
| Return (n per ray, where n is ≤3 or ≤6) | | |
| range | 19 bits (2 mm to 1000 m) | 4 bytes |
| reflectance | 10 bits | |
| doppler shift | 8-16 bits | 1-2 bytes |

Figure 2:
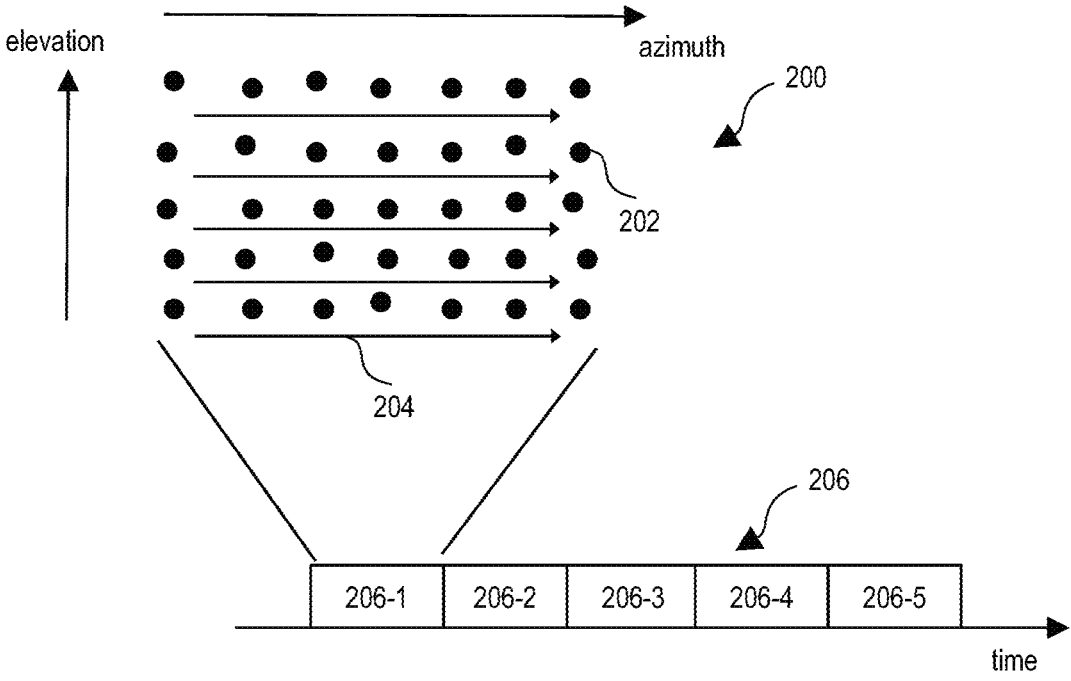
FIG. 2 schematically illustrates a lidar scan of a scene and a sequence of frames of lidar data originating from subsequent lidar scans of the scene according to embodiments.

When scanning the scene 110, the lidar 100 sends out laser rays 102 at a certain rate. Each ray 102 is sent out at an elevation angle and an azimuth angle. At least one of the elevation and azimuth angle is changed between subsequent rays 102, for example by using one or more rotating mirrors in the lidar 100, such that the elevation and azimuth angles of the emitted rays 102 form a scanning pattern. This principle is further illustrated in FIG. 2 which illustrates a scanning pattern 200 of azimuth an elevation angles of a plurality of rays emitted by the lidar during a scan of the scene. Each dot 202 corresponds to the azimuth and elevation angle of one emitted ray, and the arrows 204 indicate the order in which the rays are emitted during the scan. In this example the scanning is made in a row-wise fashion, but other scanning patterns and scanning directions are of course possible. However, it is understood that many other variants and options are possible. It is further understood that the number of rays in FIG. 2 is selected for illustrative purposes. In a more realistic case, a lidar may send out thousands of rays such as 200×250 rays, during a scan of the scene. The resolution of the lidar may change dynamically. For example, it can remain at a first resolution for a first number of subsequent frames, and then change to a second resolution in a second number of subsequent frames.

During the scan, the lidar 100 detects return signals associated with each of the emitted rays and outputs measurement values associated with the return signals, e.g., as exemplified in Table 1. The resulting data from all rays emitted during the scan is collected in a frame 206-1 of lidar data. Accordingly, the lidar data in the frame 206-1 includes measurement values from a number of lidar return signals for each ray that was emitted during the scan. Once the scan is over, the lidar 100 starts a new scan of the scene and generates lidar data which is collected in a subsequent frame 206-2 of lidar data. This is then repeated over and over again, and as a result a sequence 206 of frames 206-1, 206-2, 206-3, 206-4 of lidar data is generated, wherein the frames correspond to subsequent scans of the scene.

Figure 3:
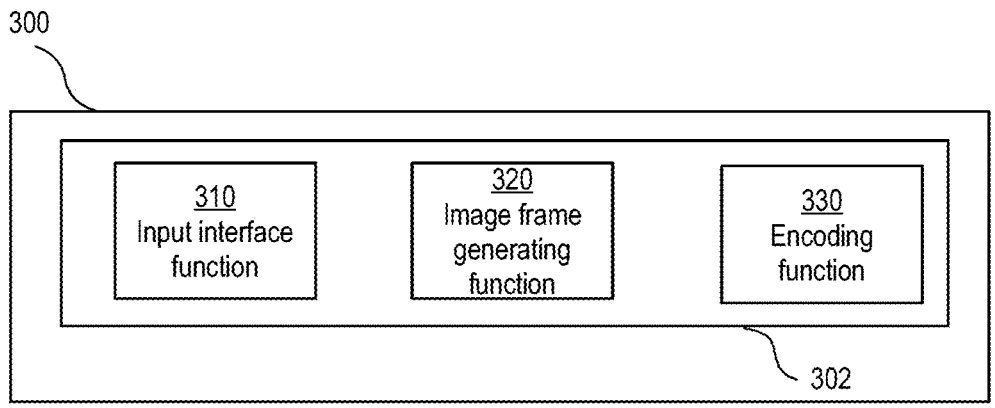
FIG. 3 schematically illustrates an encoder for encoding lidar data according to embodiments.

FIG. 3 illustrates an encoder 300 which is configured for encoding lidar data produced by the lidar 100. The encoder 300 generally comprises circuitry 302 configured to implement an input interface function 310, and image frame generating function 320, and an encoding function 330. In brief, the input interface function 310 is configured to receive subsequent frames of lidar data to be encoded, such as the sequence 206 of frames produced by lidar 100. The image frame generating function 320 is configured to represent each frame of lidar data as an image frame of a video sequence, and the encoding function 330 is configured to encode the video sequence using video encoding to provide an encoded video sequence.

In a hardware implementation, the encoder 300 may comprise, for each function 310, 320, 330 a corresponding circuitry which is dedicated and specifically designed to implement the function. The circuitry may be in the form of one or more integrated circuits, such as one or more application specific integrated circuits or one or more field-programmable gate arrays. By way of example, the encoder 300 may thus comprise circuitry which, when in use, receive subsequent frames of lidar data to be encoded.

In a software implementation, the circuitry may instead be in the form of a processor, such as a microprocessor or central processing unit, which in association with computer code instructions stored on a (non-transitory) computer-readable medium, such as a non-volatile memory, causes the encoder 300 to carry out any method disclosed herein. Examples of non-volatile memory include read-only memory, flash memory, ferroelectric RAM, magnetic computer storage devices, optical discs, and the like. In a software implementation, the functions 310, 320, 330 may thus each correspond to a portion of computer code instructions stored on the computer-readable medium, that, when executed by the processor, causes the encoder 300 to carry out the function.

It is to be understood that it is also possible to have a combination of a hardware and a software implementation, meaning that some of the functions 310, 320, 330 are implemented in hardware and others in software.

The operation of the encoder 300 when carrying out a method 400 for encoding lidar data will now be described with reference to FIGS. 4-8 and with further reference to FIGS. 1, 2 and 3.

Figure 4:
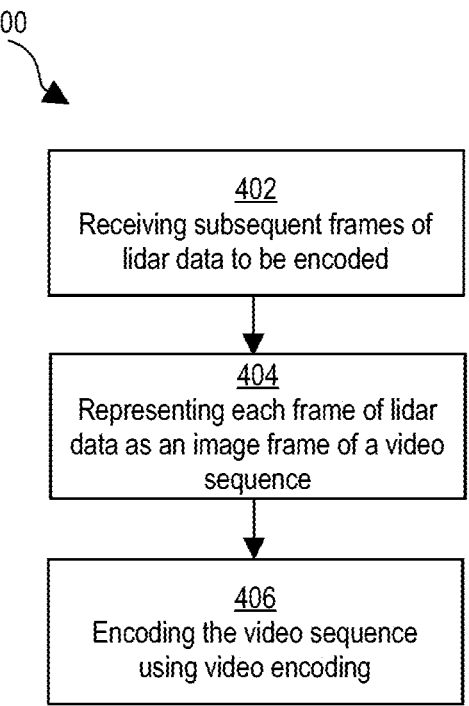
FIG. 4 is a flowchart of a method for encoding lidar data according to embodiments.

FIG. 4 is a flow chart of a method 400 for encoding lidar data. In step 402, the input interface function 310 receives subsequent frames of lidar data to be encoded, such as the frames 206-1, 206-2, 206-3, 206-4, 206-5 of the sequence of lidar frames 206 of FIG. 2. As previously described, each frame 206-1, 206-2, 206-3, 206-4, 206-5 includes data for each ray that was emitted by the lidar 100 during a scan of the scene 110. Specifically, it includes lidar measurement values associated with a number of lidar return signals for each emitted ray. For example, the lidar measurement values may include measurements of range, reflectance and/or velocity (doppler shift). In another example, the lidar measurement values includes measurements of range and reflectance. In yet another example, the lidar measurement values includes measurement of range. Additionally, as shown in Table 1, it may include scan ID, emission time, elevation angle, and azimuth angle for each emitted ray.

Figure 5:
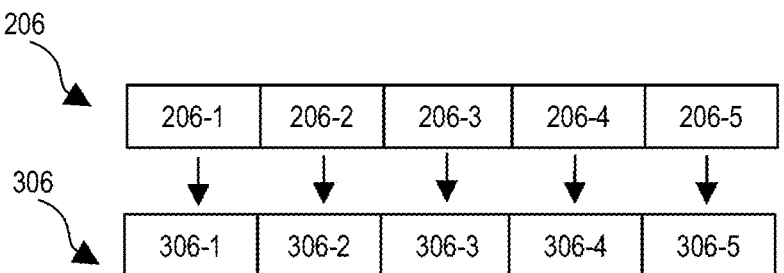
FIG. 5 schematically illustrates a sequence of frames of lidar data and a corresponding sequence of image frames forming a video sequence according to embodiments.

The input interface function 310, forwards the received frames 206-1, 206-2, 206-3, 206-4, 206-5 of lidar data to the image frame generating function 320. In step 404, the image frame generating function 304 represents each frame of lidar data as an image frame of a video sequence. As shown in FIG. 5, lidar data frame 206-1 is represented in image frame 306-1 of the video sequence 306, the lidar data frame 206-2 is represented in the subsequent image frame 306-2 of the video sequence 306, and so on. In the frame header of each image frame 306-1 to 306-5, the input interface function 310 may include an identifier of the corresponding lidar data frame, such as an identifier of which scan the lidar data frame corresponds to (cf. scan ID of Table 1). In that way, the identifier is sent once per frame instead of once per ray. Further, the frame header may include a start and optionally an end time of the lidar data frame. The end time may alternatively be calculated from the start time of the next frame. Since the lidar typically sends out rays at a known rate, the time of each ray can be derived once the start and end times of the frame are known. In that way, time information is only sent once in the frame header instead of once per ray.

Figure 6:
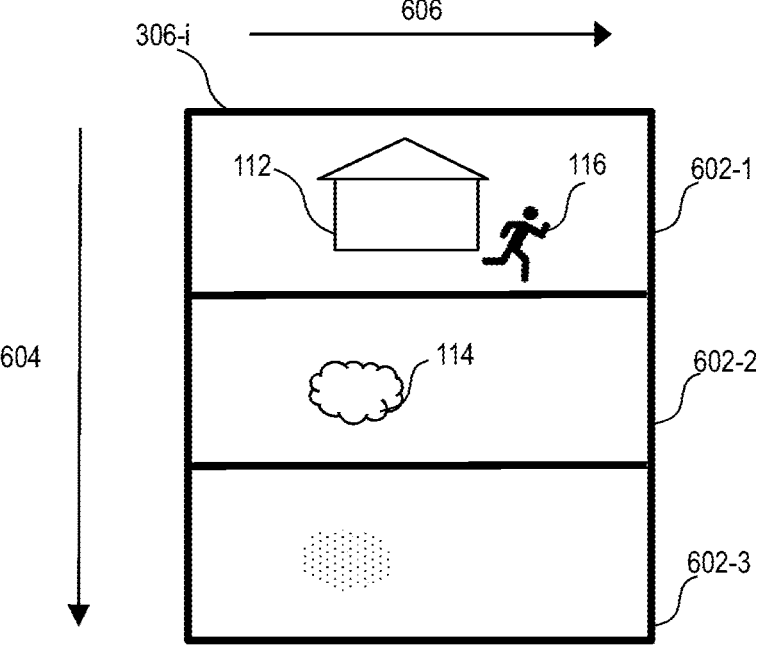
FIG. 6 schematically illustrates an image frame in which a frame of lidar data is represented according to embodiments.

FIG. 6 illustrates an image frame 306-i generated by the image frame generating function 320 in more detail. As shown, the image frame 306-i has a plurality of image portions, in this case illustrated by three image portions 602-1, 602-2, 602-3. The number of image portions corresponds to the maximum number of return signals that the lidar 100 is able to detect per ray. Continuing with the example from Table 1 above, the number of image portions may hence be three or six. The image portions 602-1, 602-2, 602-3 are in this case stacked, i.e., arranged, after each other in a column direction 604 of the image frame 306-i. However, it would also be possible to stack the image portions 602-1, 602-2, 602-3 after each other in the row direction 606 of the image frame 306-i.

When representing a frame of lidar data as the image frame 306-i, lidar measurement values of different return signals associated with an emitted ray are represented in different image portions 602-1, 602-2, 602-3 of the image frame 306-i. By way of example, suppose that two lidar return signals were detected for a first emitted ray. Then lidar measurement values of one of the lidar return signals may be represented in the first image portion 602-1, and the other lidar return signal may be represented in the second image portion 602-2. Since there were only two lidar return signals for the first ray, no lidar measurement values would then be represented for the first ray in the third image portion 602-1. Further, say that one lidar return signal was detected for a second emitted ray. Then lidar measurement values of that lidar return signal may be represented in the first image portion 602-1 while no lidar measurement values are represented for the second ray in the second and third image portions 602-2, 602-3.

When representing a frame of lidar data as an image frame 306-i, the image frame generating component 320 hence determines which lidar return signal to have its lidar measurement values represented in which image portion 602-1, 602-2, 602-3 of the image frame 306-i. In order to make that determination, the image frame generating component 320 can use different approaches. One naive approach is to sort the lidar return signals of a ray into the different image portions 602-1, 602-2, 602-3 in the order in which they appear in the frame of lidar data. That is, measurement values of a first appearing lidar return signal are represented in the first image portion 601-1, measurement values of a second appearing lidar return signal are represented in the second image portion 601-2, and so on. In more sophisticated approaches the determination depends on the lidar measurement values of the lidar return signals. For example, the determination may depend on the range, the reflectance, and/or the doppler shift of the lidar return signals. As will be described in the following, by applying these more sophisticated approaches additional bitrate savings are achieved.

In one embodiment, the lidar return signals of each ray are sorted into the different image portions 602-1, 602-2, 602-3 depending on range. In particular, the return signals are sorted into different image portions 602-1, 602-2, 602-3 in the order of decreasing range starting from the return signal having the largest measured range. Thus, for each ray, measurement values of a lidar return signal having a largest range value are represented in the first image portion 602-1. If there is more than one lidar return signal for the ray, measurement values of the lidar return signal having a second largest range value are represented in the second image portion 602-2, and so on. The reasoning behind this approach is that the return signals being associated with the largest range typically are reflections from the background of the scene, while less distant return signals more often are caused by noise such as rain drops or snowflakes. With this approach, the reflections from the background will hence appear in the same image portion, such as the first image portion 602-1 in each image frame. As the background typically remains stable over time, this allows for an efficient temporal encoding of the first image portion 602-1. This principle is further illustrated in FIG. 6, where the return signals originating from the house 112 and the person 116 are represented in the first image portion 602-1, while various reflections from the bush 114 in front of the house 112 are represented in the second and the third image portions 602-2, 602-3. Typically, the level of noise would also be larger in image portions corresponding to less distant return signals compared to image portions with more distant return signals.

In another embodiment, the lidar return signals of the emitted rays are instead sorted into the different image portions 602-1, 602-2, 602-3 depending on their doppler shift values. In particular, the determination of which lidar return signal to have its measurement values represented in which image portion depends on similarity in doppler shift values of lidar return signals of different rays. For example, the return signals are sorted into different image portions 602-1, 602-2, 602-3 such that return signals having a similar doppler shift value will have their measurement values represented in the same image portion in the present image frame 306-i as well as in the other image frames of the video sequence 306. In this case, two doppler shift values may be said to be similar if they deviate from each other by less than a predefined threshold. This could for instance be accomplished by representing return signals having doppler shift values within a first predefined interval in the first image portion 602-1, those with doppler shift values within a second predefined interval in the second image portion 602-2, and those with a third doppler shift value within the third image portion 602-3. In this embodiment, all return signals from objects moving at a certain speed will typically end up in the same image portion of the image frames, thereby allowing for efficient use of spatial and temporal video encoding of the objects. For example, all return signals originating from the person 116 would end up in the same image portion. This embodiment is particularly favourable when the lidar is used to monitor a scene in which there are many moving objects, such as traffic monitoring.

In yet another embodiment, the lidar return signals of the emitted rays are instead sorted into the different image portions 602-1, 602-2, 602-3 depending on their reflectance values. The reflectance values of the lidar return signals will vary depending on angle of incidence even if they are reflected off the same object in the scene. However, the variation in reflectance values originating from the same object would typically vary continuously. Therefore, the lidar return signals may be sorted into the different image portions 602-1, 602-2, 602-3 depending on continuity in reflectance value, such that lidar return signals having reflectance values which exhibit a continuous variation are sorted into the same image portion.

Figure 7:
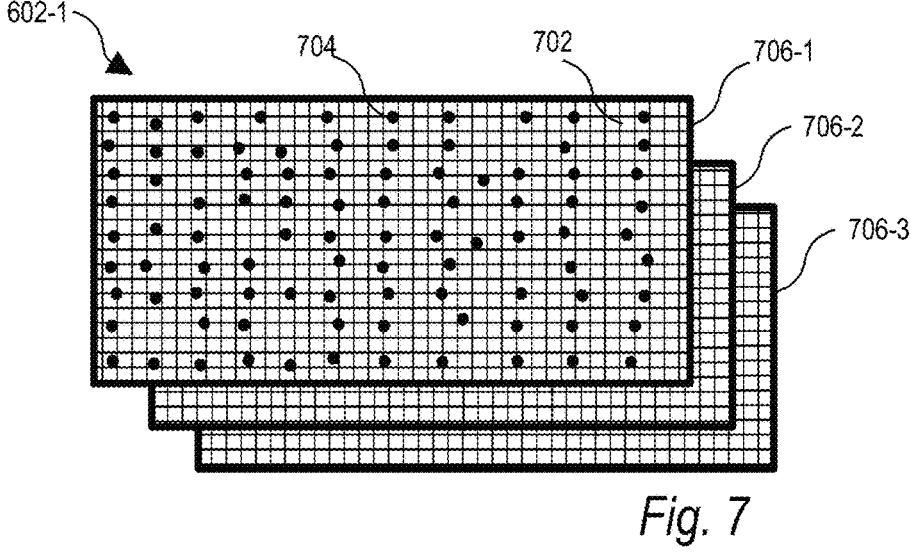
FIG. 7 schematically illustrates an image portion of the image frame of FIG. 6.

When the image frame generating function 320 has determined which lidar return signals should have their lidar measurement values represented in which image portion 602-1, 602-2, 602-3 it proceeds to represent the lidar measurement values as image data in those image portions 602-1, 602-2, 602-3. This will now be explained with reference to FIG. 7. FIG. 7 illustrates one image portion, here image portion 602-1, but it is to be understood that the same applies to all image portions. The image portion 602-1 has a pixel grid 702. The pixel grid 702 is the same for each image portion and is also fixed over time so that the pixel grid 702 is the same in all image frames 306-1 to 306-5 of the video sequence 306. The pixel grid 702 corresponds to a regular grid of elevation and azimuth angles. Hence, each pixel defined by the pixel grid 702 corresponds to an elevation and azimuth value. There is typically not a one-to-one mapping between the scanning pattern of the emitted rays as illustrated in FIG. 2, and the grid of elevation and azimuth values to which the pixel grid 702 corresponds. A reason for not using the elevation and azimuth angles of the emitted rays directly as a pixel grid is that the elevation and azimuth angles of the emitted rays do not necessarily form a regular grid, and additionally they will vary slightly from scan to scan and are hence not the same in each frame of lidar data. Still, the grid of elevation and azimuth angles defined by the pixel grid 702 covers the scanning pattern of elevation and azimuth angles of the emitted rays. Preferably, the number of pixels in each of the elevation and azimuth directions of the pixel grid 702 is higher, such as doubled, compared to the scanning pattern of the emitted rays for reasons of avoiding aliasing problems when performing interpolation as will be described next. By way of example, if the lidar in each scan emits rays in a 200×250 scanning pattern, a pixel grid of 400×500 may be used.

The pixel values in the image portion 602-1 is formed from the lidar measurement values of the radar return signals to be represented in image portion 602-1. In order to form the pixel values of the image portion 602-1, the image frame generating function 320 interpolates the lidar measurement values from the elevation and azimuth angles of the emitted rays to the pixel grid 702 of the image portion 602-1. Referring again to FIG. 7, the dots 704 schematically illustrate the elevation and azimuth angles associated with those return signals that should have their lidar measurement values represented in image portion 602-1. As can be seen, the dots are not perfectly aligned with the pixel grid 702 and there is no one-to-one mapping between the elevation and azimuth angles of the lidar return signals and the pixels of the pixel grid 702. Therefore, interpolation is used to map the lidar measurement values of the lidar return signals to the pixels of the pixel grid 702. For that purpose, any conventional interpolation method may be used such as linear or splines interpolation.

As previously mentioned, the lidar measurement values of each lidar return signal may include measurement values of various parameters including a first parameter (range), a second parameter (reflectivity), and/or a third parameter (doppler shift). In order to represent all measurement values in a single image frame, different color channels 706-1,

706-2, 706-3 can be used. For instance, the measurement values of the first parameter can be represented in a first color channel 706-1, the measurement values of the second parameter can be represented in a second color channel 706-2, and the measurement values of the third parameter can be represented in the third color channel 706-3. The first color channel may correspond to the luma (Y) channel and the second and third color channels may correspond to the chroma channels (U, V) of the YUV color format which is commonly used in video encoding. Thus, the measurement values of the first parameter of the lidar return signals are interpolated to the pixel grid 702 and the result is arranged in the first color channel 706-1. The same is applied to the second and/or third parameter and the results are arranged in the second 706-2 and the third color channel 706-3, respectively. Thus, after interpolation each pixel in the image portion 602-1 includes interpolated values of the different parameters in different color channels.

One particular version of the YUV color format which is common in video encoding is the YUV 4:2:0 color format. In some embodiments, the image frame generating function 320 therefore represents the frames of lidar data 206-1, 206-2, 206-3, 206-4, 206-5 in the YUV 4:2:0 color format. In the YUV color format the spatial resolution is lower in the second and the third color channel (U,V) than in the first color channel (Y). In more detail the resolution is four times lower (halved in each of the row direction and column direction) in the luma channel chroma channels U and V compared to the luma channel Y. Accordingly, the second color channel 706-2 and the third color channel 706-3 of the image portion 602-1 may have a resolution which is four times lower than that of the first color channel 706-1. This means that the pixel grid 702 in the second and third color channels 706-2, 706-3 has a resolution which is four times lower than the pixel grid 702 in the first color channel 706-1. By way of example, if a pixel grid of 400×500 is used in the first color channel 706-1, a pixel grid of 200×250 is used in the other two color channels 706-2, 706-3.

It is further common in video encoding to work with a 10 or 8 bit YUV 4:2:0 color format, i.e., where the pixel values in each channel are represented by 10 or 8 bits. As can be seen in Table 1 above, some of the measurement values in the lidar data may be represented by more than 10 or 8 bits. It will now be described how one can proceed in such situations.

In the following example it is assumed that the pixel values of the image frame 306-i are represented using a second number of bits, such as 8 or 10 bits, while the lidar measurement values includes a measurement value which is represented using a first number of bits, such as 16 or 19 bits. The first number of bits used to represent the measurement value is then divided into several subsets of bits, including a first and a second subset. This may be thought of as dividing a pixel into several pixels which includes different subsets of the bits of the original pixel. As will be explained below, these pixels will be located in different sub-portions of an image portion. The division of the pixels is typically performed after the measurement values have been interpolated to the pixel grid of the image portions as explained above. Each subset of bits includes at most the second number of bits so that the subset can be represented as a pixel value in the image frame 306-i. For example, if a measurement value is represented by 16 bits, it may be divided into two subsets of 8 bits each so that each subset can be represented by a pixel value with 8 bits. It is understood that sometimes two subsets are enough while in other cases further subsets are needed to make the number of bits in the subsets fit within the limit set by the second number of bits. As an alternative to having further subsets, the first number of bits may be reduced by setting some bits to zero before dividing it into subsets. For instance, in Table 1 the range measurement is represented by 19 bits, which possibly could be reduced to say 16 bits by setting the first and/or last bits to zero depending on whether short or large distances are of most importance in the application at hand. By way of example, with 19 bits, ranges in the interval 2 mm-1000 m may be represented, while with 16 bits ranges in the interval 5 mm to 500 m may be represented.

In cases where the lidar data includes measurement values of more than one parameter, the above-described division of the bits representing a measurement value into subsets is applied to each measurement value. Each measurement value is divided into the same number of subsets. To exemplify, assume that the lidar data uses 16 bits to represent range, 10 bits to represent reflectance, and 8 bits to represent doppler shift. Then the range value could be divided into two subsets with 8 bits each, the reflectance into two subsets with 5 bits each, and the doppler shift into two subsets with 4 bits each. The first of these subsets would be arranged in different color channels of a first sub-portion of an image portion, while the second of these subsets would be arranged in different color channels of a second sub-portion of the image portion. As is understood, there are many alternative ways of dividing the bits into subsets in this example. For example, the doppler shift could instead be divided into a first subset will 8 bits and a second empty subset with no bits. In that case, the second sub-portion of the image portion will be empty, such as including a null value or a zero value, in that color channel.

For a measurement value that should be represented in a certain image portion of the image frame 306-i, the different subsets of bits are represented in different sub-portions of that image portion. In particular, a first subset of the first number of bits is represented in a first sub-portion of the image portion and a second subset of the first number of bits will be represented in a second sub-portion of the image portion. This is further illustrated in FIG. 8 which shows that each image portion 602-1, 602-2, 602-3 of image frame 306-i has a plurality of sub-portions for accommodating the different subsets of the first number of bits. In this case, image portion 602-1 has two sub-portions 602-11 and 602-12, image portion 602-2 has two sub-portions 602-21 and 602-22, and image portion 602-3 has two sub-portions 602-31 and 602-32. It is understood that the number of sub-portions is the same as the number of subsets of the first number of bits used to represent the measurement values.

The different sub-portions 602-11, 602-12 of an image portion 602-1 have corresponding pixel grids, meaning that for each pixel in the first sub-portion 602-11 there is a pixel in the second sub-portion 602-12 which corresponds to the same elevation and azimuth angle. Differently stated, the pixel grid of the second sub-portion is a copy of the pixel grid of the first sub-portion. In particular, pixels having the same relative position (such as top left position) in the first sub-portion 602-11 and in the second sub-portion 602-12 correspond to the same elevation and azimuth angle. The pixel values in these pixels originate from the same measurement values of the lidar data but includes different subsets of bits of the measurement values are previously explained.

Figure 8:
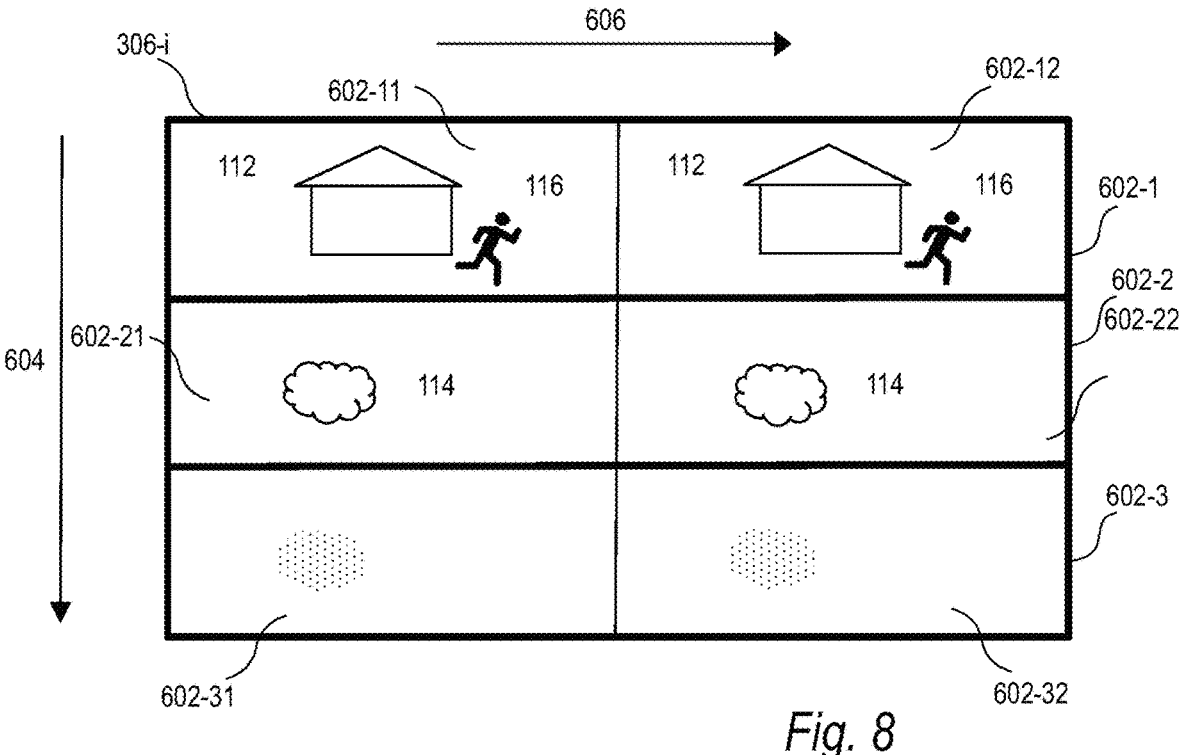
FIG. 8 schematically illustrates an image frame in which a frame of lidar data is represented according to embodiments.

The sub-portions are stacked, i.e., arranged after each other in one of the row direction 606 and the column direction 604 of the image frame 306-i. In this case, the second sub-portions 602-12, 602-22, 602-32 are stacked after the respective first sub-portions 602-11, 602-21, 602-31 in the row direction. It would also be possible to stack them after each other in the column direction so that the order of the sub-portions in the column direction would be 602-11, 602-12, 602-21, 602-22, 602-31, 602-32. Embodiments where both the image portions and the sub-portions thereof are stacked in the row direction 606 could also be envisaged. However, it is often more efficient from an encoding perspective to have an image frame of more equal dimensions in the row and column directions. Therefore, if the image portions 602-1, 602-2, 602-3 are stacked after each other in one of the row and the column direction, the sub-portions of each image portion are preferably stacked after each other in the other of the row and the column direction as illustrated in FIG. 8.

There are different approaches for how to divide the first number of bits used to represent a measurement value into subsets including a first and a second subset. In one approach, the first subset includes the odd bits (bit 1, 3, 5, etc.) and the second subset the even bits (bit 0, 2, 4, etc.). If more than two subsets are needed, this approach generalizes into arranging every i:th bit into an i:th subset.

In another approach, the first subset of bits includes the most significant bits and the second subset the least significant bits. By way of example, if a measurement value is represented by 10 bits, the five most significant bits may be included in the first subset and the 5 least significant bits in the second subset. If more than two subsets of bits are needed, this approach generalized into arranging the first number of bits into the subsets such that the subsets include bits of decreasing order of significance. In this case, as an encoding error in the subset of most significant bits will have a larger impact than an encoding error in the subset of least significant bits, it may be advantageous to append one or more ancillary bits to the first subset with most significant bits prior to encoding. For example, two three, or four ancillary bits may be added. These ancillary bits will act as a buffer to reduce the impact of encoding errors. The ancillary bits may have predefined values so as to facilitate identifying and removing them at the decoder side. To exemplify, assume that a measurement value is represented by twelve bits which is divided into two subsets with six bits each. To each subset, two ancillary bits with the value zero are appended such that the resulting subsets have eight bits. After encoding and subsequent decoding, the last two bits of each subset are removed and the two subsets are rejoined to reconstruct the measurement value.

Once the image frame generating function 320 has represented each frame 206-1 to 206-5 of lidar data as an image frame 306-1 to 306-5 of a video sequence 306, the encoding function 330 proceeds to encode the video sequence 306 using video encoding. For this purpose, it may use standard video encoding tools such as h.264, h.265, or AV1. Such video encoding tools typically offer division of the image frames into slices and/or tiles which can be encoded and decoded separately from each other. In this case, at least two of the different image portions 602-1, 602-2, 602-3 can be encoded as different slices or tiles. For example, each image portion 602-1, 602-3, 602-3 can be encoded as a different slice. In another example, two of the image portions, such as image portions 602-1, 602-2, are encoded as one slice and the remaining image portion 602-3 is encoded as another slice. In embodiments like the one in FIG. 8 where the image portions 602-1, 602-2, 602-3 in turn includes several sub-portions 602-11, 602-12, 602-21, 602-22, 602-31, 602-32, different sub-portions may be encoded as different slices or tiles. For example, the first sub-portion 602-11 and the second sub-portion 602-12 of image portion 602-1 may be encoded as different tiles. The same may apply to all image portions 602-1, 602-2, 602-3 or only to some of them depending on the desired granularity.

Further, when encoding the video sequence 306, the video encoding function 320 may apply different levels of compression to at least two of the different image portions 602-1, 602-2, 602-3. The level of compression may correspond to a quantization parameter, QP, used in the compression. In one example, a lower compression level is applied to image portions in which more distant return signals have their measurement values represented compared to image portions in which less distant return signals have their measurement values represented. Referring to the embodiments of FIGS. 6 and 8, a lowest compression level would then be applied to image portion 602-1 which corresponds to the return signals with highest range value, an intermediate compression level would be applied to image portion 602-2 which corresponds to the return signals with the second highest range value, and a highest compression level would be applied to image portion 602-3 which corresponds to the third highest range value.

The compression level may also be set to differ between different sub-portions of the image portions 602-1, 602-2, 602-3 to deal with the fact that an encoding error may have different impact in different sub-portions. For example, in an embodiment where odd bits (bits 1, 3, 5 etc.) are arranged in a first sub-portion and even bits (bit 0, 2, 4, etc.) are arranged in a second sub-portion, an error in the first sub-portion is doubled in size compared to an error in the second sub-portion. Therefore, a lower compression level, such as a halved compression error, may be used in the first sub-portion compared to the second sub-portion. In embodiments where the most significant bits are arranged in the first sub-portion and the least significant bits are arranged in a second sub-portion, a lower compression level is preferably used in the first sub-portion than in the second sub-portion. In the case that ancillary bits are appended to the first sub-portion with the most significant bits, the compression level in the first sub-portion may be set so that the maximum possible compression error does not exceed the largest number that can be represented by the ancillary bits.

The encoding function 330 may encode the video sequence 306 according to a group of pictures (GOP) structure. In cases where the resolution of the lidar data changes dynamically, the GOPs may be synchronized with the changes in lidar resolution. For example, if the lidar provides a first resolution during a first number of subsequent lidar frames and a second resolution during a second number of subsequent lidar frames, the image frames corresponding to the first number of lidar frames may be encoded as a first GOP and the image frames corresponding to the second number of lidar frames may be encoded as a second GOP.

The invention claimed is:

1. A method for encoding lidar data, comprising:
   receiving subsequent frames of lidar data to be encoded, each frame of lidar data comprising a number of lidar return signals for each of a plurality of rays emitted at a respective elevation and azimuth angle by a lidar, each lidar return signal including lidar measurement values comprising a measurement value of a first parameter, a measurement value of a second parameter, and a measurement value of a third parameter,
   representing each frame of lidar data as an image frame of a video sequence, whereby for each ray of the plurality of rays of the frame of lidar data, lidar measurement values of different lidar return signals are represented in different image portions of the image frame, the different image portions being stacked after each other in a row direction or a column direction of the image frame,
   wherein each image portion has a pixel grid corresponding to elevation and azimuth angles and pixel values formed from the lidar measurement values of the lidar return signals represented in that image portion, wherein the pixel values of an image portion are formed from the lidar measurement values by interpolating the lidar measurement values from the elevation and azimuth angles of the plurality of rays to the pixel grid of the image portion,
   wherein the measurement value of the first parameter is represented in a first color channel of the image frame, the measurement value of the second parameter is represented in a second color channel of the image frame, and the measurement value of the third parameter is represented in a third color channel of the image frame, and
   encoding the video sequence using video encoding.

2. The method of claim 1, wherein for each ray of the plurality of rays of the frame of lidar data, which lidar return signal to have its lidar measurement values represented in which image portion is determined depending on the lidar measurement values of the lidar return signal.

3. The method of claim 1, wherein the lidar measurement values of each lidar return signal include a range value, and for each ray of the plurality of rays of the frame of lidar data, the measurement values of a lidar return signal having a largest range value are represented in a first image portion, and measurement values of a lidar return signal having a second largest range value are represented in a second image portion.

4. The method of claim 2, wherein the lidar measurement values of each lidar return signal include a doppler shift value, and the determination of which lidar return signal to have its measurement values represented in which image portion depends on similarity in doppler shift values of lidar return signals of different rays.

5. The method of claim 1, wherein at least two of the different image portions are encoded as different slices or tiles.

6. The method of claim 1, wherein, when encoding the video sequence, different levels of compression are applied to at least two of the image portions.

7. The method of claim 1,
   wherein the lidar measurement values includes a measurement value of a first parameter which is represented using a first number of bits, and wherein pixel values in the image frame are represented by a second number of bits which is lower than the first number of bits,
   wherein, for each image portion, a first subset of the first number of bits is represented in a first sub-portion of the image portion and a second subset of the first number of bits is represented in a second sub-portion of the image portion, and
   wherein the second sub-portion of the image portion is stacked after the first sub-portion of the image portion in one of said row direction or column direction of the image frame.

8. The method of claim 7, wherein the first subset of bits and the second subset of bits are odd and even bits, respectively.

9. The method of claim 7, wherein the first subset of bits includes the most significant bits and the second subset of bits includes the least significant bits, and wherein one or more ancillary bits are appended to the first subset of bits prior to encoding.

10. The method of claim 7, wherein the first sub-portion and the second sub-portion of at least one image portion are encoded as different slices or tiles.

11. The method of claim 7, wherein, when encoding the video sequence, a lower level of compression is applied to the first sub-portion compared to the second sub-portion of at least one image portion.

12. An encoder for encoding lidar data, comprising circuitry configured to implement:

an input interface function configured to receive subsequent frames of lidar data to be encoded, each frame of lidar data comprising a number of lidar return signals for each of a plurality of rays emitted at a respective elevation and azimuth angle by a lidar, each lidar return signal including lidar measurement values comprising a measurement value of a first parameter, a measurement value of a second parameter, and a measurement value of a third parameter, an image frame generating function configured to represent each frame of lidar data as an image frame of a video sequence, whereby for each ray of the plurality of rays of the frame of lidar data, lidar measurement values of different lidar return signals are represented in different image portions of the image frame, the different image portions being stacked after each other in a row direction or a column direction of the image frame, wherein each image portion has a pixel grid corresponding to elevation and azimuth angles and pixel values formed from the lidar measurement values of the lidar return signals represented in that image portion, wherein the pixel values of an image portion are formed from the lidar measurement values by interpolating the lidar measurement values from the elevation and azimuth angles of the plurality of rays to the pixel grid of the image portion, wherein the measurement value of the first parameter is represented in a first color channel of the image frame, the measurement value of the second parameter is represented in a second color channel of the image frame, and the measurement value of the third parameter is represented in a third color channel of the image frame, and an encoding function configured to encode the video sequence using video encoding.

13. A non-transitory computer-readable medium comprising computer code instructions which, when executed by a device having processing capability, cause the device to carry out a method for encoding lidar data, comprising:

receiving subsequent frames of lidar data to be encoded, each frame of lidar data comprising a number of lidar return signals for each of a plurality of rays emitted at a respective elevation and azimuth angle by a lidar, each lidar return signal including lidar measurement values comprising a measurement value of a first parameter, a measurement value of a second parameter, and a measurement value of a third parameter, representing each frame of lidar data as an image frame of a video sequence, whereby for each ray of the plurality of rays of the frame of lidar data, lidar measurement values of different lidar return signals are represented in different image portions of the image frame, the different image portions being stacked after each other in a row direction or a column direction of the image frame, wherein each image portion has a pixel grid corresponding to elevation and azimuth angles and pixel values formed from the lidar measurement values of the lidar return signals represented in that image portion, wherein the pixel values of an image portion are formed from the lidar measurement values by interpolating the lidar measurement values from the elevation and azimuth angles of the plurality of rays to the pixel grid of the image portion, wherein the measurement value of the first parameter is represented in a first color channel of the image frame, the measurement value of the second parameter is represented in a second color channel of the image frame, and the measurement value of the third parameter is represented in a third color channel of the image frame, and encoding the video sequence using video encoding.

\* \* \* \* \*